United States Patent
Hartenstine et al.

(10) Patent No.: US 7,819,485 B2
(45) Date of Patent: Oct. 26, 2010

(54) SAFETY HARNESS ATTACHMENT SYSTEM FOR JUVENILE PRODUCTS

(75) Inventors: Curtis M. Hartenstine, Birdsboro, PA (US); Peter R. Tuckey, Morgantown, PA (US)

(73) Assignee: Wonderland Nurserygoods Co., Ltd., Neihu Taipei (TW)

( * ) Notice: Subject to any disclaimer, the term of this patent is extended or adjusted under 35 U.S.C. 154(b) by 310 days.

(21) Appl. No.: 11/968,744

(22) Filed: Jan. 3, 2008

(65) Prior Publication Data

US 2008/0164735 A1 Jul. 10, 2008

Related U.S. Application Data

(60) Provisional application No. 60/878,837, filed on Jan. 5, 2007.

(51) Int. Cl.
*A47D 5/00* (2006.01)
(52) U.S. Cl. .................................. 297/484; 297/250.1
(58) Field of Classification Search .............. 297/250.1, 297/484, 483
See application file for complete search history.

(56) References Cited

U.S. PATENT DOCUMENTS

| 5,135,285 | A | * | 8/1992 | Dukatz et al. | ............... 297/484 |
| 5,449,223 | A | * | 9/1995 | Miculici et al. | ............ 297/484 |
| 6,695,412 | B2 | * | 2/2004 | Barger et al. | ........... 297/484 X |

* cited by examiner

*Primary Examiner*—Anthony D Barfield
(74) *Attorney, Agent, or Firm*—Miller Law Group, PLLC

(57) ABSTRACT

An attachment system is formed into the seating structure of a juvenile product to allow the installation and removal of a harness belt having an occluding structure, such as a buckle or an orthogonal flap sewn at the end of the belt, without requiring access to the back side of the seating structure to manipulate the end portion of the belt. The attachment system includes a retainer slot having a height sufficient to permit the passage of the webbing material, and an access opening having a height that allows the passage of the occluding structure without forcing the occluding structure against the webbing material. The access opening is connected to the retainer slot by a narrow passageway that is located intermediate the ends of the retainer slot, but adjacent one end, to enable the manipulation an edge of the webbing material from the retainer slot into the narrow passageway.

20 Claims, 12 Drawing Sheets

Fig. 16
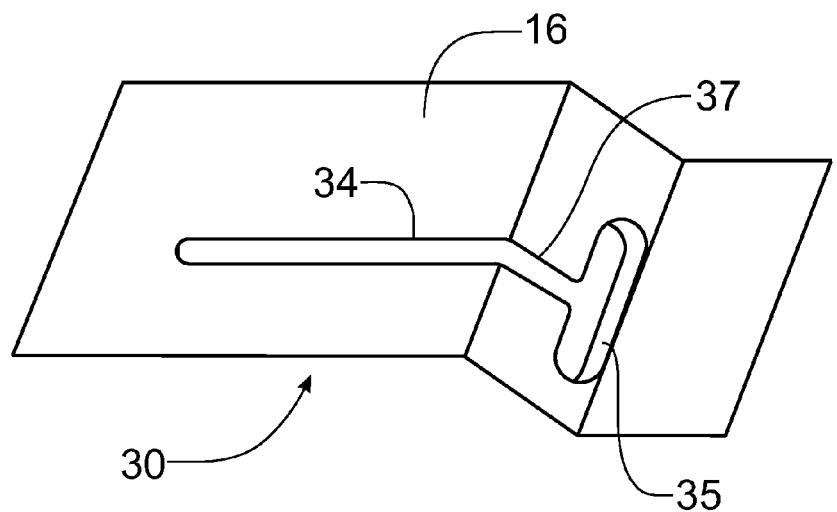
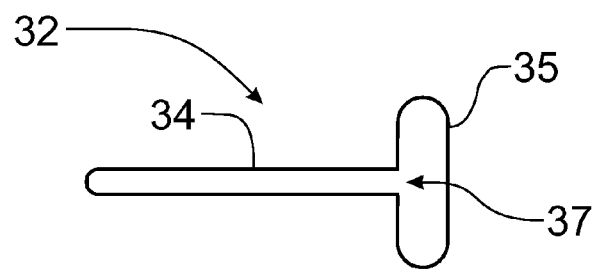
Fig. 17
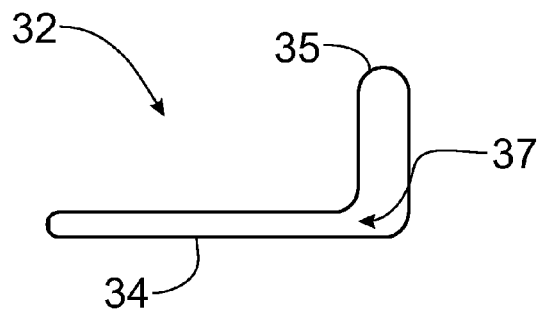
Fig. 18

SAFETY HARNESS ATTACHMENT SYSTEM FOR JUVENILE PRODUCTS

CROSS-REFERENCE TO RELATED APPLICATIONS

This application claims priority on U.S. Provisional Patent Application Ser. No. 60/878,837, filed on Jan. 5, 2007; the contents of which is incorporated herein by reference.

FIELD OF THE INVENTION

The present invention relates generally to juvenile products that utilize a safety harness to retain the child on the product and, more particularly, to an attachment structure for detachably connecting a safety harness to the product.

BACKGROUND OF THE INVENTION

The use of a restraint system as a safety harness utilizing webbing attached to a seating structure is very common in juvenile products. Examples of such juvenile products are car seats, infant carriers, and swings. Normally, the safety harness for the seating structure of the juvenile product needs to be attached securely, so as to pass product restraint requirements, yet the attachment also has to designed so as to allow removal of the webbing from the seating structure to facilitate cleaning and to re-position the webbing material to another location on the juvenile product in order to better accommodate the size of the child.

The restraint system is typically a harness formed from webbing material, which can be constructed from polypropylene, nylon, polyester or other suitable materials, that is formed to provide an end structure that is larger than the webbing material and can be oriented to provide a restriction to the passage of the harness belt through the slotted opening in the back of the juvenile product. One such harness belt would include a buckle affixed to the end of the belt that would rotate on the end of the belt to occlude the passage of the belt through the slotted opening in the juvenile product. Another harness belt configuration has the webbing material folded over on itself at the end of the harness belt and sewn to provide a flap that is oriented perpendicularly to the harness. In known juvenile products, the product is provided with a slotted opening that has a dimension that will allow the passage of the webbing with the occluding structure (e.g. buckle, flap, etc.) retracted flat against the webbing and held in this retracted state manually. Once the occluding structure is passed through the slotted opening, the occluding structure is released and allowed to return to the normal orientation that is perpendicular to the webbing. In this normal orientation, the occluding structure cannot pass back through the slotted opening and the webbing is retained on the juvenile product for utilization as a safety harness.

Removing the harness from engagement with the juvenile product requires that the occluding structure be accessible from behind the seating structure so that the occluding structure can once again be folded over against the webbing material and manually restrained in this position until passed back through the slotted opening in the structure. While this method of attachment of the end of the safety harness to the seating structure is very effective and very functional, the requirement to be able to access the rearward side of the seating structure to be able to fold the occluding structure over onto the webbing material prevents the back side of the juvenile product from being finished with a smooth cover or other aesthetically pleasing structure, as such a covering structure would prevent access to the occluding structure at the end of the harness webbing material.

Accordingly, it would be desirable to provide a system for attachment of webbing material forming the safety harness of a juvenile product to allow for easy removal of the harness belt from the product without restricting or defacing the aesthetic appearance on the back side of the product.

SUMMARY OF THE INVENTION

It is an object of this invention to provide an system for attachment of a safety harness formed from conventional webbing material that overcomes the aforementioned disadvantages of the prior art.

It is another object of this invention to provide a juvenile product with an attachment system for detachably connecting the end portion of a safety harness to the juvenile product without requiring access to the back side of the juvenile product to detach the safety harness.

It is a feature of this invention that the attachment system for the safety harness incorporates a retainer slot and an access opening in communication with the retainer slot.

It is an advantage of this invention that the end portion of a safety harness can be passed through the access opening of the attachment system and slid from the access opening into the retainer slot to secure the safety harness to the seating structure of the juvenile product.

It is another advantage of this invention that the safety harness can be detached from the seating structure of the juvenile product without requiring access to the back side of the seating structure to manipulate the end portion of the webbing material.

It is another feature of this invention that the safety harness can be detached from the seating structure of the juvenile product by passing the webbing material from the retainer slot into the access opening.

It is still another advantage of this invention that the end portion of the safety harness can be retracted from the access opening of the attachment system without requiring the occluding structure at the end of the harness belt to be folded against the webbing material.

It is still another feature of this invention that the back side of the seating structure of the juvenile product can be finished with a cover that provides an aesthetically pleasing appearance.

It is yet another advantage of this invention that the attachment system can be utilized for a product utilizing a safety harness where the back side of the seating structure is not accessible.

It is yet another feature of this invention that the end portions of the webbing material forming the safety harness can be hidden from view along the back side of the seating structure of the juvenile product.

It is a further feature of this invention that the access opening is oriented at an angle to the retainer slot and connected thereto by a narrow passageway.

It is still another feature of this invention that the access opening is connected to the retainer slot at a location intermediate the opposing ends of the retainer slot, preferably adjacent one end of the retainer slot.

It is a further advantage of this invention that the connection of the narrow passageway between the access opening and the retainer slot intermediate the opposing ends of the retainer slot restricts movement of the webbing material from the retainer slot into the access opening.

It is yet a further feature of this invention that the relocation of the webbing material from the retainer slot into the access opening through the narrow passageway requires a manual manipulation of the webbing material to direct a lateral edge of the webbing material into the narrow passageway.

It is still another object of this invention to provide an attachment system for a juvenile product that is durable in construction, inexpensive of manufacture, carefree of maintenance, facile in assemblage, and simple and effective in use.

These and other objects, features and advantages are accomplished according to the instant invention by providing an attachment system formed into the seating structure of a juvenile product, such as a car seat, infant carrier or child swing, that allows the installation and removal of the safety harness constructed of webbing material having an occluding structure, such as a buckle or an orthogonal flap sewn at the end of the webbing material, without requiring access to the back side of the seating structure to manipulate the end portion of the webbing material. The attachment system includes a retainer slot having a height sufficient to permit the passage of the webbing material, and an access opening having a height that allows the passage of the occluding structure without forcing the occluding structure against the webbing material. The access opening is connected to the retainer slot by a narrow passageway that is located intermediate the ends of the retainer slot, but adjacent one end, to enable the manipulation an edge of the webbing material from the retainer slot into the narrow passageway.

BRIEF DESCRIPTION OF THE DRAWINGS

The advantages of this invention will be apparent upon consideration of the following detailed disclosure of the invention, especially when taken in conjunction with the accompanying drawings wherein:

FIG. 16 is a plan view of another alternative embodiment of the attachment system in which the access opening is on a different plane than the retention slot;

FIG. 17 is a plan view of yet another alternative embodiment of the attachment system in which the access opening is located laterally of the retention slot; and FIG. 18 is a plan view of still another alternative embodiment of the attachment system in which the access opening is located at the end of the retention slot and offset relative to the axis of the retention slot.

DETAILED DESCRIPTION OF THE PREFERRED EMBODIMENT

Figure 1:
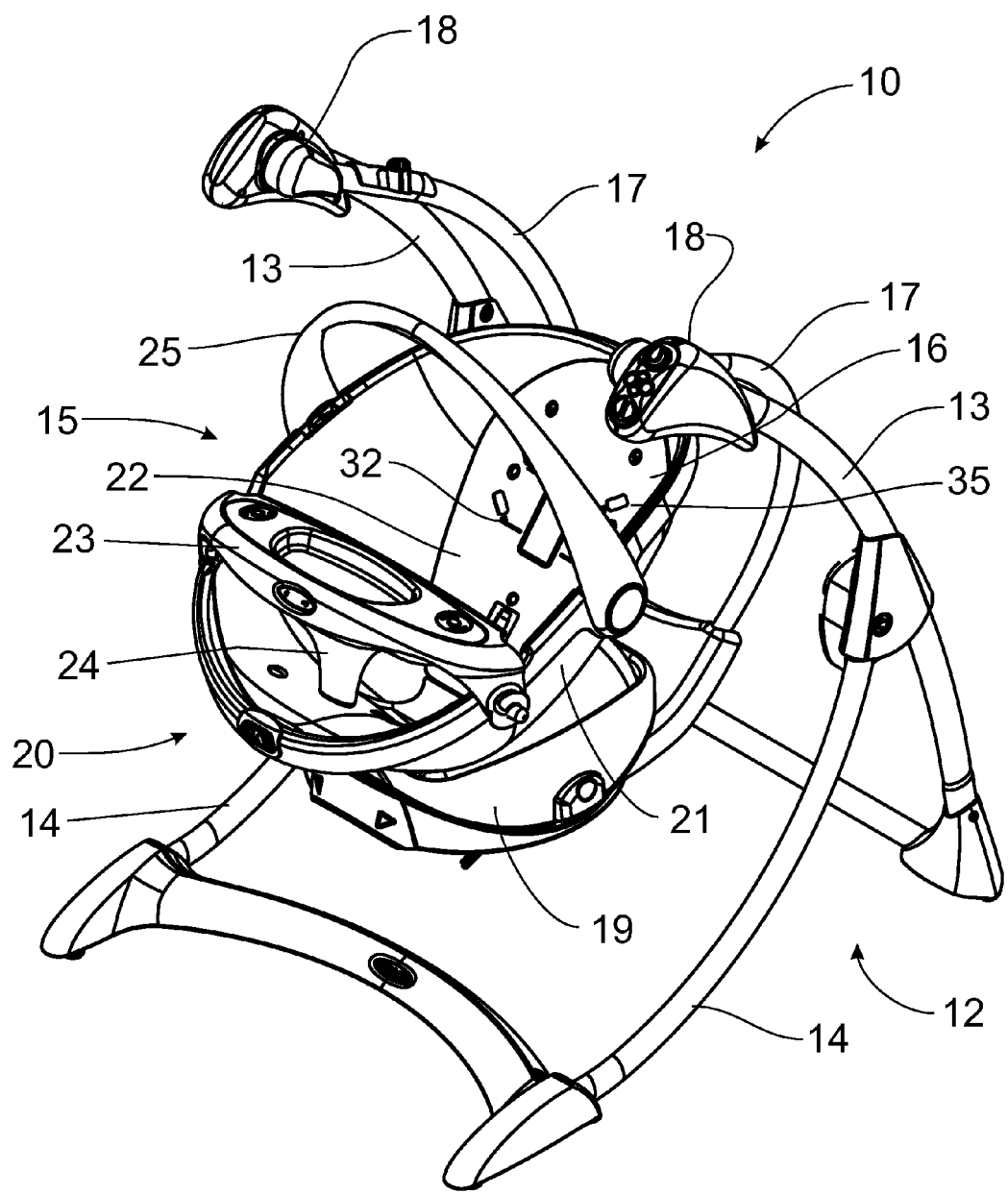
FIG. 1 is a upper front perspective view of the infant swing incorporating the principles of the instant invention.

Referring now to the drawings, an infant swing incorporating the principles of the instant invention can best be seen. The instant invention is intended for use on any juvenile product on which a safety harness constructed of webbing material with an end portion formed by folding the webbing material over onto itself and sewing the webbing material to form a flap that is then oriented generally perpendicularly to the major axis of the harness formed from the webbing material. Examples of such juvenile products are car seats, child swings, infant carriers, strollers and the like which have a seating structure including a back portion against which the child rests.

Figure 10:
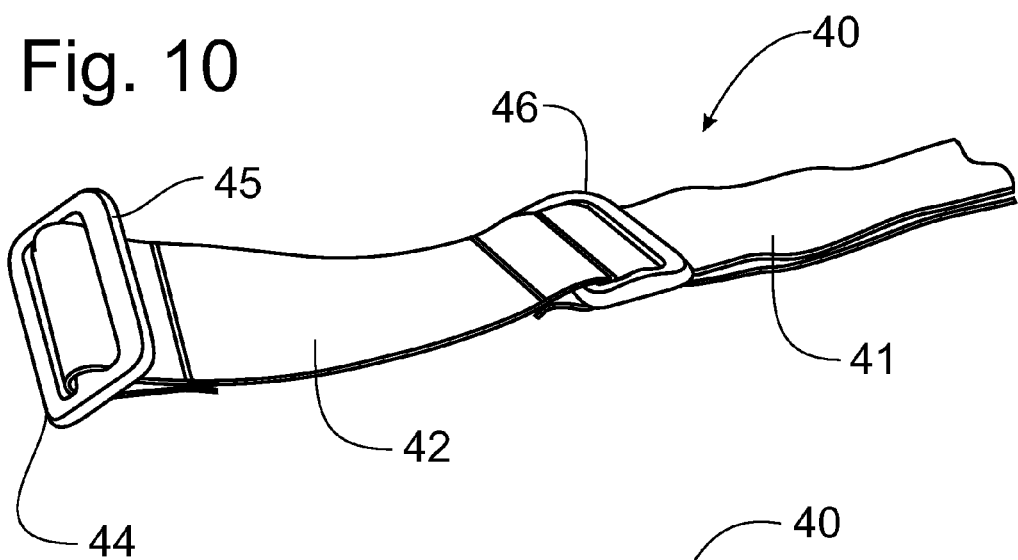
FIG. 10 is a perspective view of a representative harness belt having a buckle mounted at the end thereof.
Figure 11:
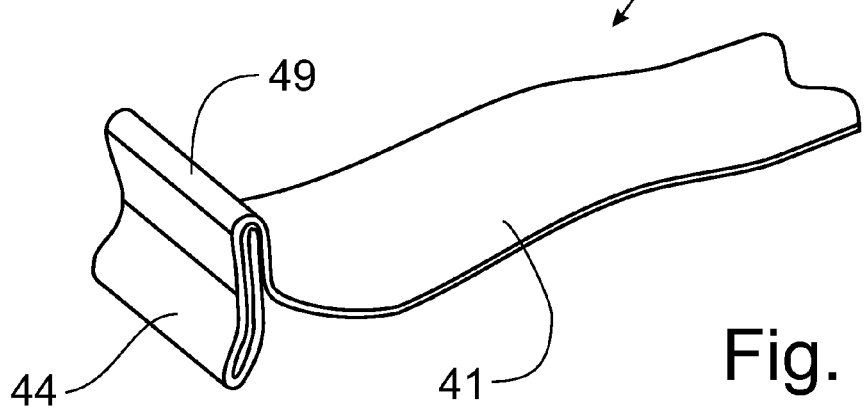
FIG. 11 is perspective view of a representative harness belt having a flap folded over on itself and sewed into an orthogonally oriented position.
Figure 12:
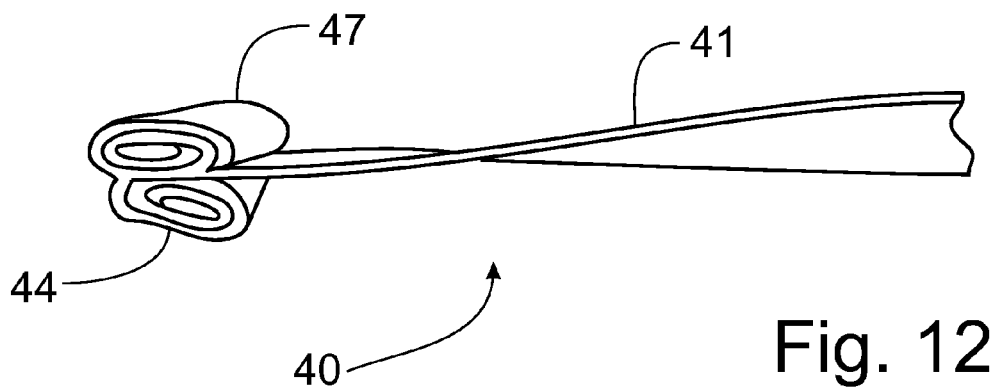
FIG. 12 is a perspective view of a representative harness belt having a knot of webbing material formed and sewed at the end thereof.

Representative examples of a harness belt 40 provided with an occluding structure 44 at the end 43 thereof are shown in FIGS. 10-12. In one embodiment of the harness belt 40, a buckle 45 is mounted at the end 43 of an end piece of webbing material 42 connected to an intermediate, adjusting buckle 46 having the webbing material 41 forming the primary harness belt 40 connected thereto. The buckle 45 can be oriented against the end webbing material 42 so as to be only slightly thicker than the end webbing material 42. A second embodiment of the harness belt 40 is depicted in FIG. 11 in which the end 43 of the webbing material 41 is folded over on itself and sewn to create a flap 49 that is oriented generally orthogonally to the webbing material 41. As with the buckle structure 45, the flap 49 can be retracted against the adjacent webbing material 41 to create a temporary configuration, as long as the flap 49 is so restrained, that is only slightly thicker than the webbing material 41. A third representative embodiment of a harness belt 40 is shown in FIG. 12 in which a knot 47 is formed at the end 43 of the webbing material 41. This knot 47 can be compressed to fit through an appropriately sized slotted opening in the back of a juvenile product, but after passing through the back wall of the product resumes its normal thickness to provide an occluding structure 44 to the re-passage of the structure 44 through the slotted opening.

Figure 13:
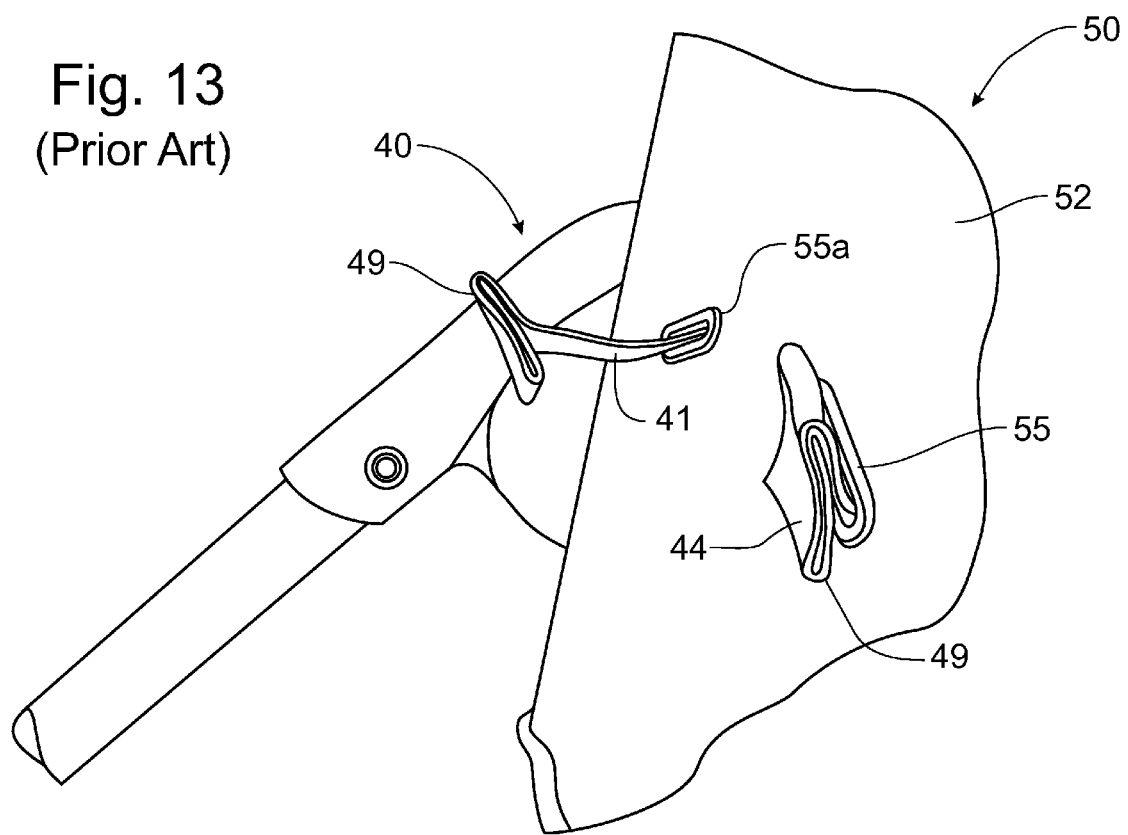
FIG. 13 is a perspective view of the back side of a prior art representative juvenile product with a pair of harness belts projecting through the back side of the product with one harness belt positioned to project away from the product and the other harness belt being pulled against the back side of the product with the flap preventing the harness belt from pulling through the slot.

Referring to FIG. 13, a representative prior art juvenile product 50 having a back wall 52 formed with a pair of slotted openings 55, 55a therein having a suitable opening height to accommodate the thickness of the webbing material with the occluding structure 44 restrained against the adjacent webbing material 41 to minimize the thickness of the end portion 43. The second embodiment of the harness belt 40, depicted in FIG. 11, is shown projecting through the slotted openings 55 with the flap 49 sewn at the end portion 43 of the webbing material 41 presenting the occluding structure 44. Once through the conventional slotted opening 55, the flap 49 resumes its orientation substantially perpendicular to the webbing material 41 and prevents the end portion 43 from being pulled back through the slotted opening 55. At one of the slotted openings 55*a*, the webbing material 41 is pushed through the slotted opening 55*a* to locate the flap 49 remotely from the back wall 52, such as would be found during the initial installation of the harness belt 40 through the slotted opening 55*a*.

The other slotted opening 55 has the flap 49 pulled against the back wall 52 in an occluding orientation that prevents the flap 49 and the harness belt 40 from passing back through the back wall 52 of the product 50. One skilled in the art will recognize that other occluding structures, such as the buckle 45 and the knot 47 would also function as depicted in FIG. 13. Removal of the webbing material 41 from the conventional juvenile product 50 is accomplished by reaching to the back side of the product 50 and again manipulating the occluding structure 44 to be retracted against the adjacent webbing material 41 to allow the occluding structure 44 to be passed back through the slotted opening 55. Such a configuration requires that the end portion 43 be accessible rearwardly of the seating structure, which typically means that the back wall 52 of the juvenile product 50 will not be covered with an aesthetically pleasing cover member.

Figure 2:
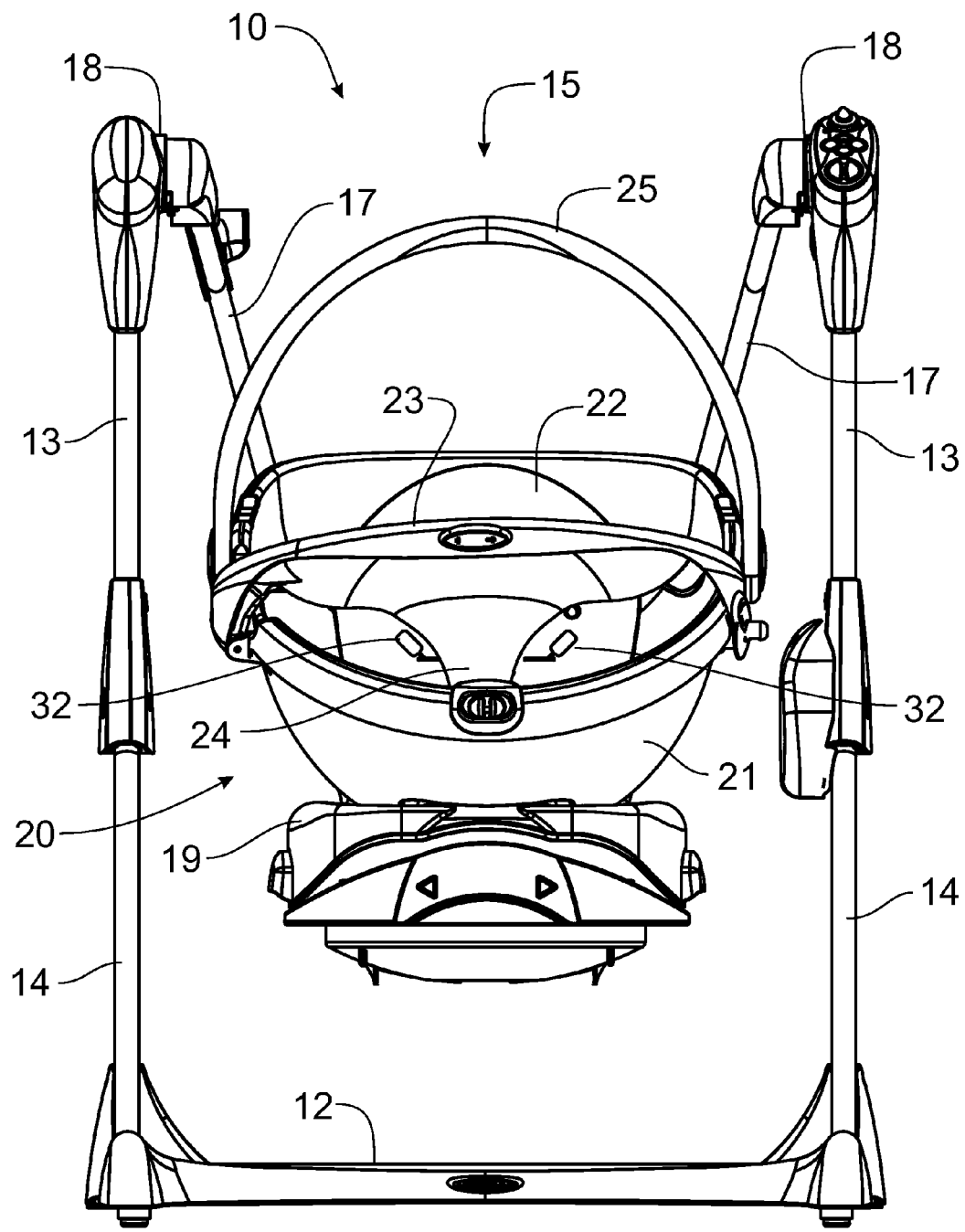
FIG. 2 is a front elevational view of the infant swing depicted in FIG. 1.
Figure 3:
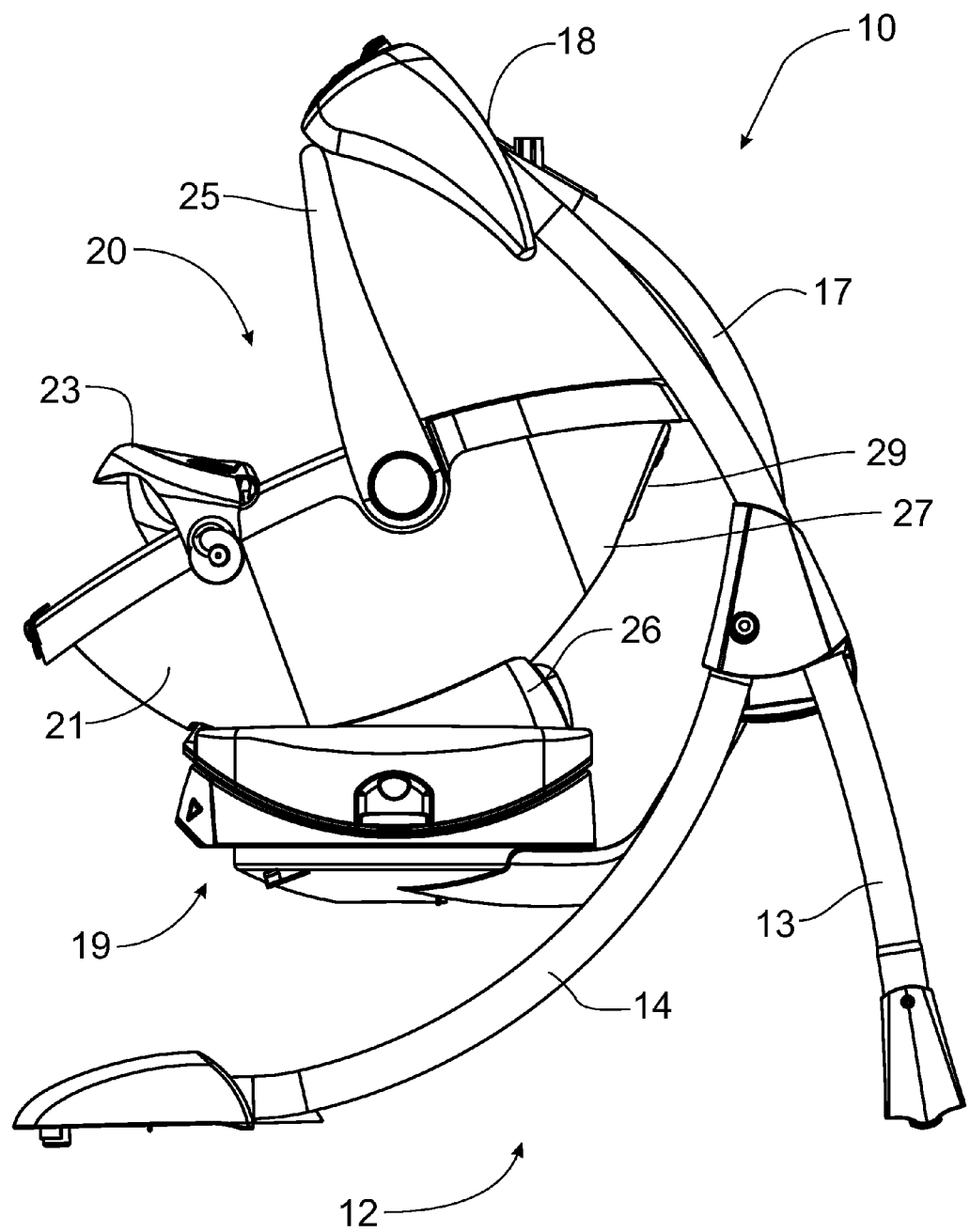
FIG. 3 is a left side elevational view of the infant swing shown in FIGS. 1 and 2.

As a representative example of a juvenile product on which a safety harness formed by webbing material having an end portion sewn to be oriented perpendicularly, the infant swing 10, as can best be seen in FIGS. 1-3, includes as the major components thereof a support frame assembly 12, including a pair of transversely spaced rear legs 13 and a corresponding pair of front legs 14, and a seat assembly 15 suspended from the frame assembly 12 for a fore-and-aft swinging movement. The seating structure 15 is formed of a molded seat carrier 20 detachably mounted via a mounting structure 26 to a base member 19 affixed to a pair of transversely spaced hangers 17 that are connected to corresponding hanger housings 18 positioned at the cantilevered ends of the rear legs 13.

Figure 4:
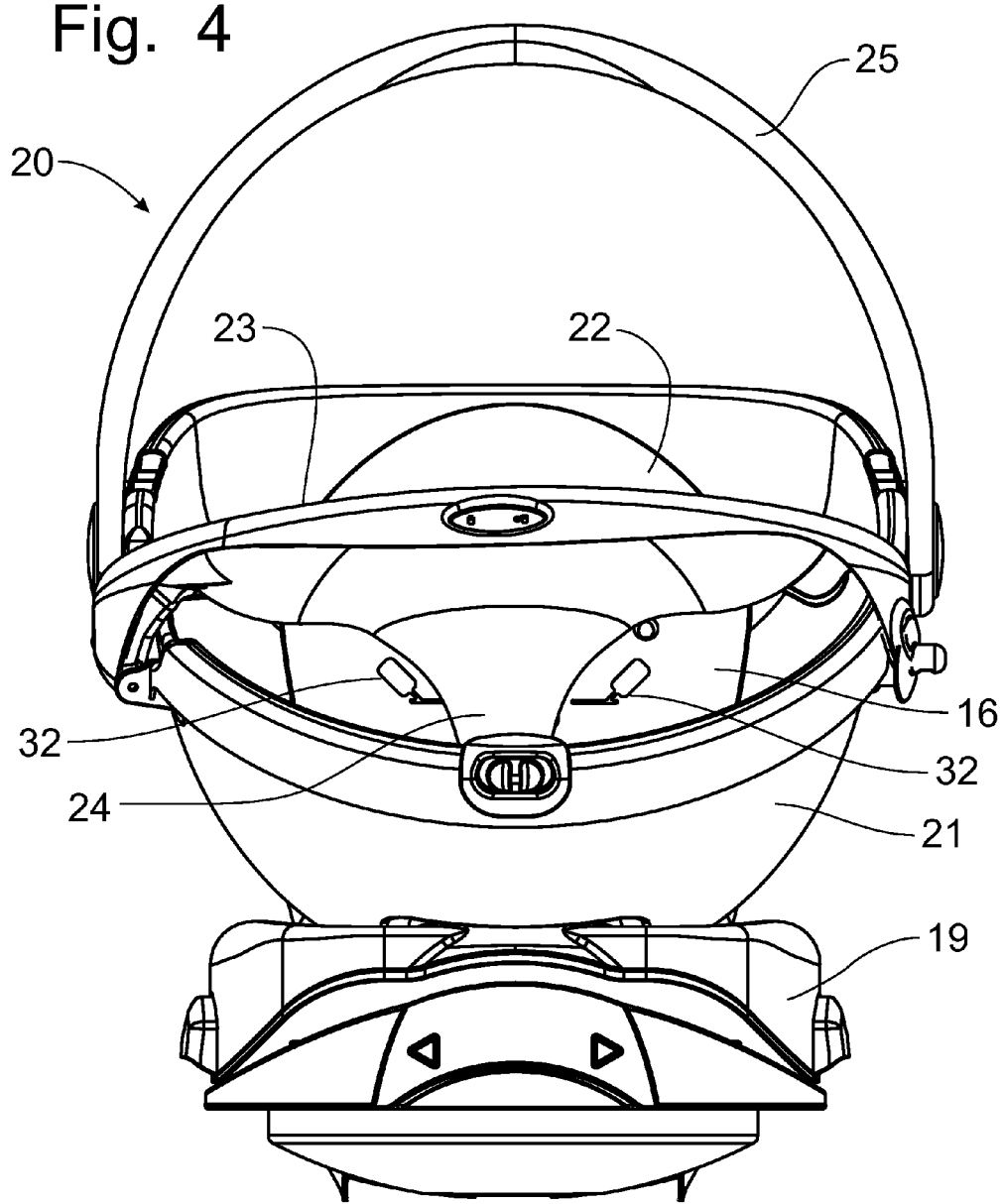
FIG. 4 is an enlarged front elevational view of the seat carrier mounted on the base member with the hanger tubes and support frame of the infant swing shown in FIG. 2 being broken away for purposes of clarity.
Figure 5:
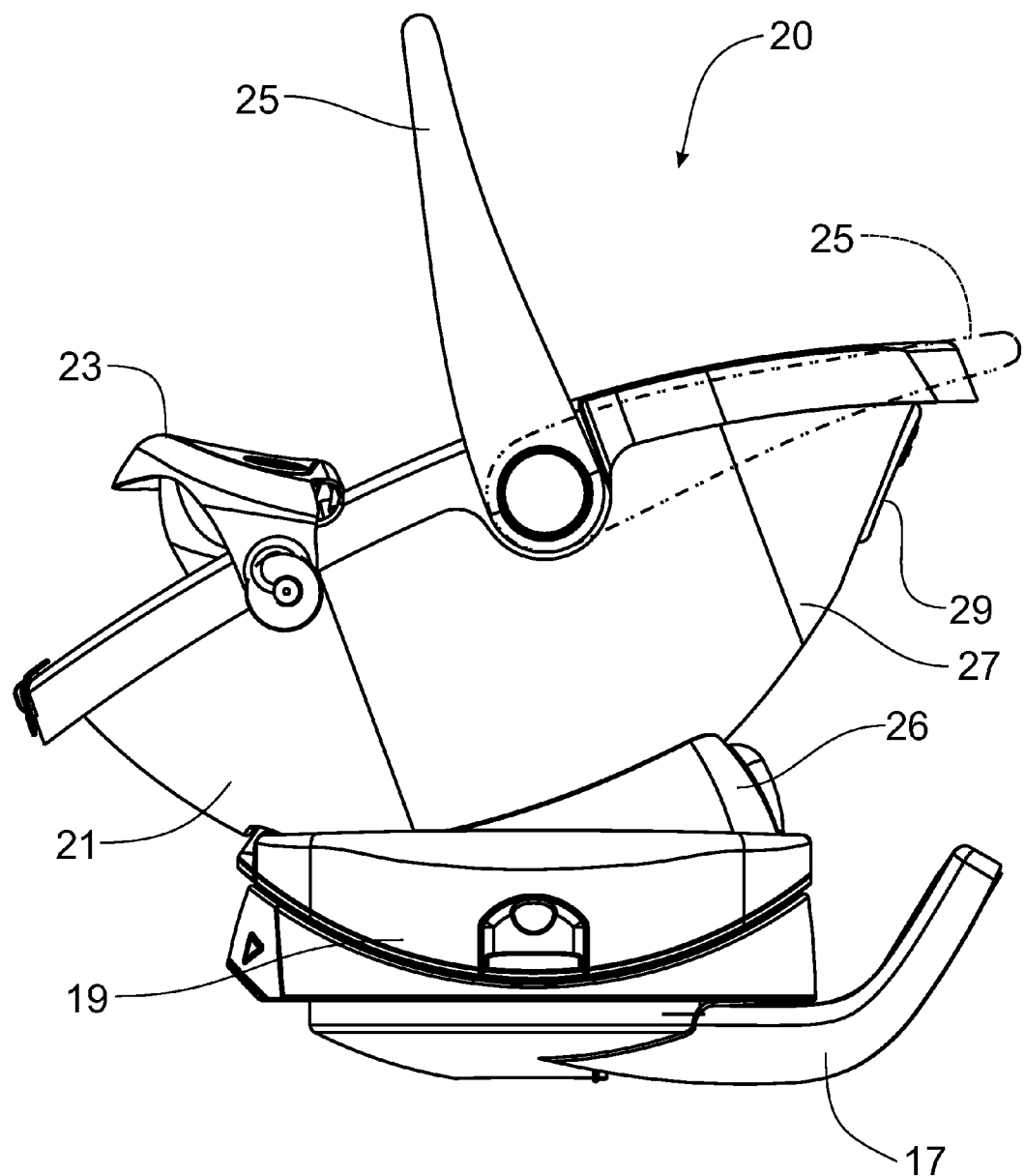
FIG. 5 is a left side elevational view of the seat carrier and base member shown in FIG. 4, the folded position of the carrier handle being shown in phantom.
Figure 6:
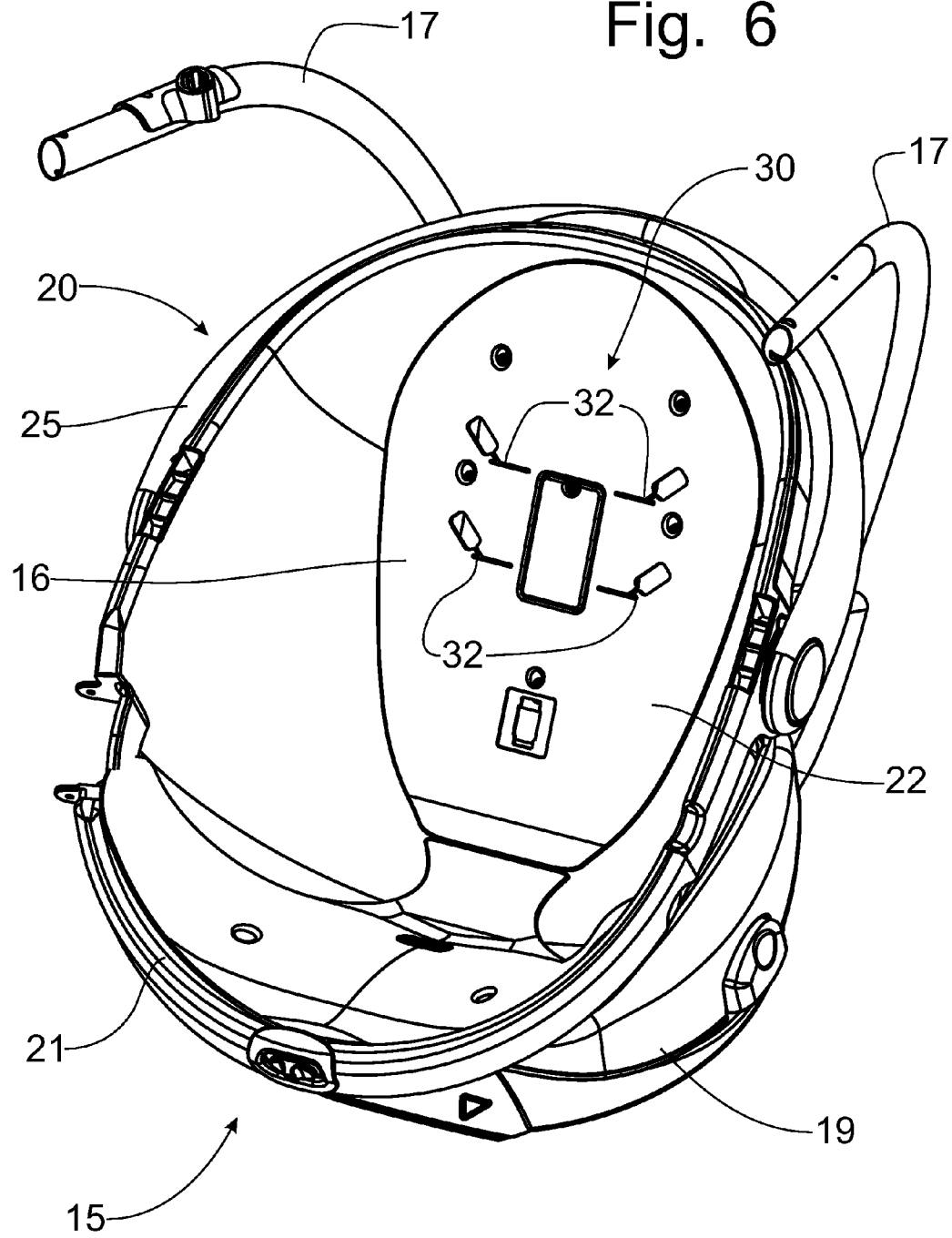
FIG. 6 is an enlarged upper, front perspective view of the seat carrier with the tray and yoke structure being removed for purposes of clarity.
Figure 7:
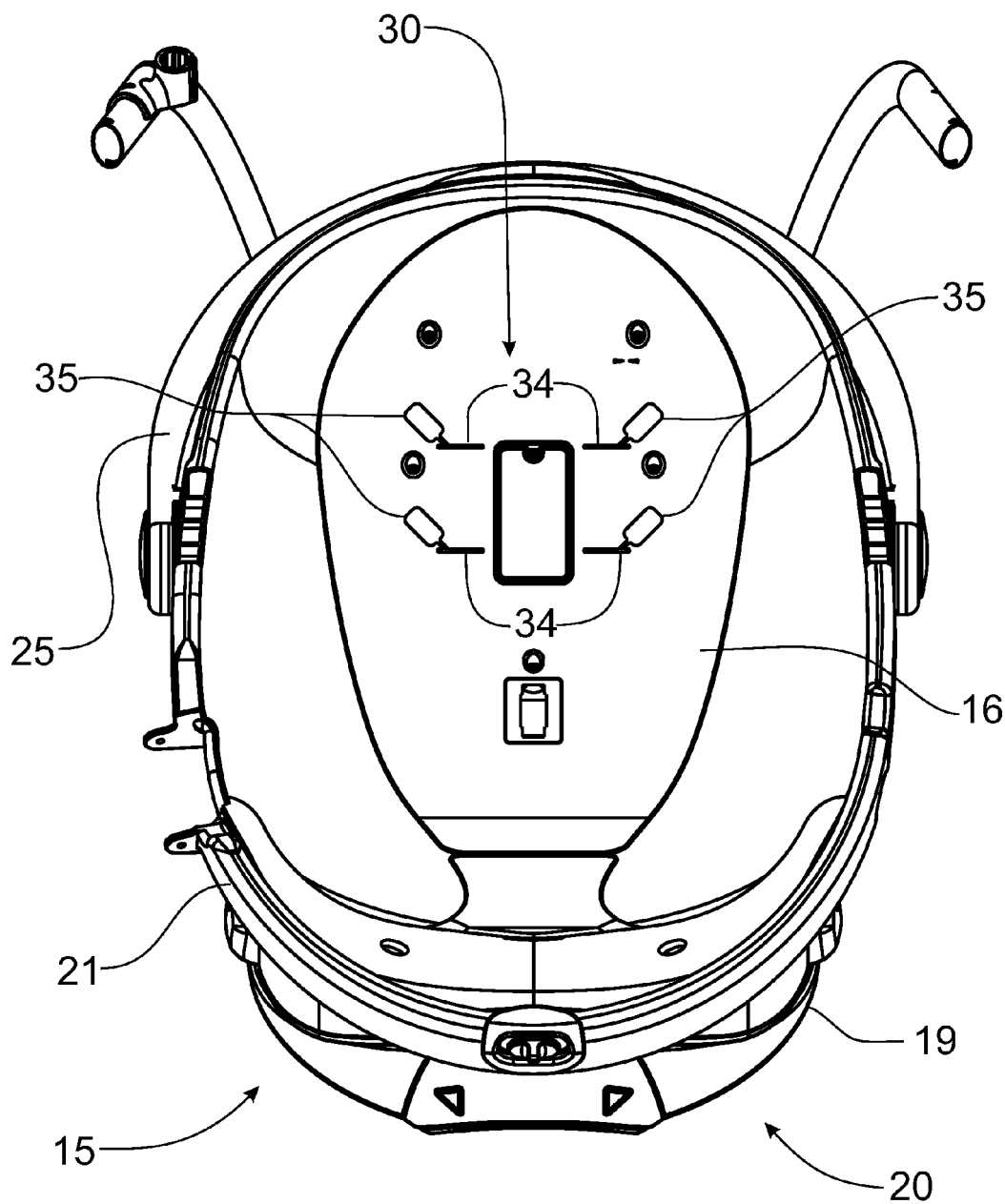
FIG. 7 is a front elevational view of the seat carrier shown in FIG. 6.

The seat carrier 20 is configured to be used in multiple applications, such as a car seat or a stroller, in addition to being used in the infant swing assembly 10 as will be described in detail below. The seat carrier 20 is formed with an exterior shell 21 supporting a seat 22 onto which an infant is supported and restrained. The exterior shell 21 has a removable tray 23 mounted at a forward position and defining a yoke 24 that prevents an infant from sliding forwardly out of the seat 22. The exterior shell 21 is also provided with a pivoted lift handle 25 that is movable between an upright position, shown in FIGS. 4 and 5, and a folded or retracted position which is shown in phantom in FIG. 5. The rear portion of the exterior shell 21 forms an outer cover 27 that provides a smooth, aesthetically pleasing outer surface that hides functional structure within the shell 21, such as a latch mechanism (not shown) that can be actuated through the latch member 29 at the rear of the seat carrier 20.

Figure 9:
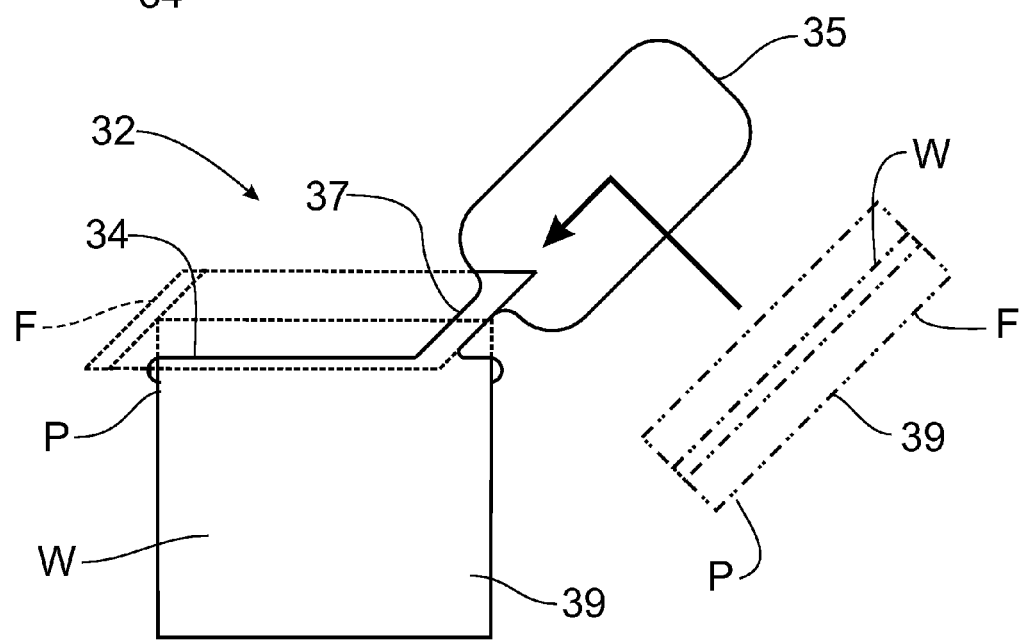
FIG. 9 is an enlarged detail view similar to that of FIG. 8, but schematically depicting representative webbing material end portions being directed into the access opening and also being retained in the retainer slot.

The seating structure 15 includes an inner wall 16 that provides the primary support for the back of the child seated on the seat carrier 20. The seat carrier 20 utilizes a safety harness 39 to restrain the child from moving out of the seating structure 15. This safety harness 39, as is schematically represented in FIG. 9, can be formed in the conventional manner described above with the end portion P including a flap F sewn at the end portion to be oriented generally perpendicularly to the webbing material W from which the safety harness 39 is constructed. The inner wall 16 is formed with an attachment system 30, incorporating the principles of the instant invention, including a series of webbing retainer apertures 32 through which the end portion P is inserted, as desired, to secure the end portion P of the webbing material W to the seating structure 15.

The attachment system 30 preferably includes a plurality of pairs of webbing retainer apertures 32 spaced vertically in the inner wall 16. Each respective pair of webbing retainer apertures 32 correspond to a selected positioning of the safety harness 39 relative to the child seated on the seat carrier 20. As the child grows, the webbing material W can be removed from one pair of webbing retainer apertures 32, as will be described in greater detail below, and moved to a higher pair of webbing retainer apertures 32 so that the safety harness 39 can be positioned properly over the shoulders of the child. One skilled in the art will recognize that some juvenile products may only require a single pair of webbing retainer apertures 32 due to the particular use of the product. Such products may, nevertheless, need to have the safety harness 39 removed to clean the product. Accordingly, a single pair of webbing retainer apertures 32 would provide a convenient attachment system for the safety harness 39 that would facilitate the removal of the safety harness 39.

Each webbing retainer aperture 32 is formed with a retainer slot 34 in which the webbing material W can extend with the flap F lodged behind the inner wall 16. The height of the retainer slot 34 can be smaller than a conventional slotted opening because the retainer slot 34 needs only to allow the passage of a single thickness of the webbing material W, as opposed to a flap P folded against the webbing material W, as is conventional in the prior art. To permit the passage of the flap F through the inner wall 16 so that the flap F can be lodged behind the inner wall while the webbing material W extends through the retainer slot 34, the webbing retainer aperture 34 includes an access opening 35 that has a height in the opening that will allow the passage of the flap F without having to fold the flap F against the webbing material W. The length of the access opening 35 can be somewhat smaller than the corresponding width dimension of the webbing material W because the flap F can be inserted into and withdrawn from the access opening 35 in a diagonal manner, as will be described below.

Figure 8:
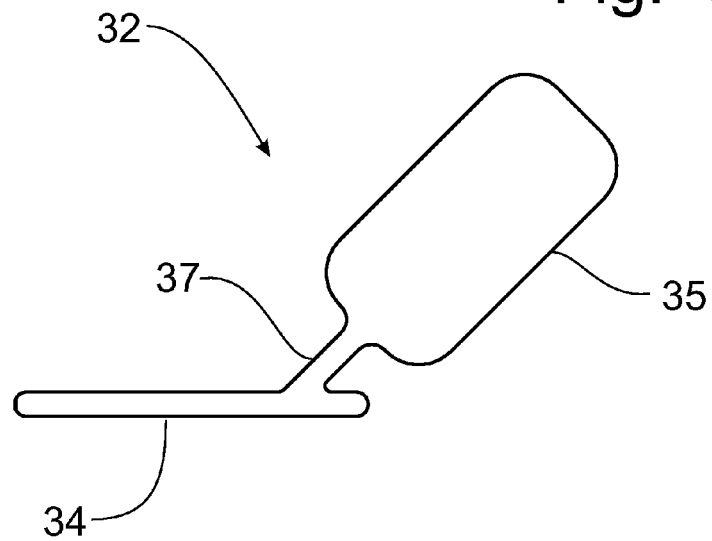
FIG. 8 is an enlarged detail view of the attachment system formed in the seating structure of the juvenile product.

The access opening 35 is connected to the retainer slot 34 by a narrow passageway 37 so that the retainer slot 34 is in communication with the access opening 35 for the movement of the webbing material W. The narrow passageway 37 and the access opening 35 are oriented at an angle, preferably at about 45 degrees, to the orientation of the retainer slot 34, which eases the movement of the webbing material W from the access opening 35 into the retainer slot 34. Furthermore, the narrow passageway 37 opens into the retainer slot 34 intermediate of the opposing ends of the retainer slot 34, though preferably adjacent to, though spaced from the end of the retainer slot 34 a distance that is at least slightly greater than the height of the retainer slot 34, which in turn roughly corresponds to the thickness of the webbing material W, as is best seen in FIG. 8. With this configuration, the webbing material W that is positioned in the retainer slot will not be able to move in a manner that will position the edge of the webbing material W within the narrow passageway 37 unless manually manipulated there.

In operation, the safety harness 39 can be engaged with a selected one of the webbing retainer apertures 32 by grasping the end portion P and inserting the flap F into the access opening 35. If the length of the access opening 35 is less than the corresponding length dimension of the end portion P, the end portion P can be inserted diagonally into the access opening 35 by first inserting the end of the flap F corresponding to the passageway end of the access opening 35 into the access opening 35 and sliding the flap F behind the inner wall 16 while the webbing material enters the narrow passageway 37 until the distal end of the flap F passes into and through the access opening 35.

The webbing material W is then moved along the narrow passageway 37 while guiding the edge of the webbing material W through the passageway 37 and into the retainer slot 34. The webbing material W is moved along the retainer slot 34 until positioned against the far end of the retainer slot 34. Conventional webbing material W has sufficient flexibility that the near edge of the webbing material can be compressed and/or bunched into the retainer slot 34 so that the near edge of the webbing material W can be withdrawn from the passageway 37 and placed completely into the retainer slot 34. In this position, the flap F is completely behind the inner wall 16 and presents a sufficiently wide barricade that cannot pass through the retainer slot 34. Until the webbing material W is manually compressed to urge the near edge of the webbing material W into the narrow passageway 37, the safety harness 39 is trapped within the retainer slot 34 and secured in the seating structure 15.

Removal of the safety harness 39 is essentially the opposite of the installation procedure described above. The near edge of the webbing material W is compressed manually within the retainer slot 34 until the near edge of the webbing material can be directed into the narrow passageway 37. The webbing material W can then be slid along the narrow passageway 37 to withdraw the webbing material W from the retainer slot 34 into the access opening 35, where the flap F can be moved through the access opening 35 either directly or diagonally, as needed to slide the safety harness 39 out of the webbing retainer aperture 32.

With the safety harness 39 capable of being both installed into and removed from the inner wall 16 of the seating structure 15 without requiring accessibility to the back side of the inner wall 16 to manipulate the end portion P of the webbing material W, particularly to remove the safety harness 39, the back side of the juvenile product can be covered with an outer wall or cover 27 to present a smooth surfaced and aesthetically pleasing juvenile product. With the utilization of the outer cover 27, the end portions P of the safety harnesses 39 will not be readily viewable, yet the safety harnesses 39 can be at least as easily inserted into and removed from the seating structure 15 as is known in the art.

While the preferred embodiment of the webbing retainer apertures 32 is described above with the access opening oriented at about a 45 degree angle to the retainer slot 34 and connected via a narrow passageway 37 that intersects the retainer slot 34 at an intermediate point along the length thereof, one skilled in the art will recognize that the access opening 35 could be located to either side of the retainer slot 34 and could be located either above or below the retainer slot 34 to provide the function of the instant invention as described in detail above. In addition, the access opening 35 could be oriented parallel to the retainer slot 34, and positioned above, below, in line with and on either side thereof. The use of a connecting passageway 37 restricts the movement of the webbing material from the retainer slot 34 into the access opening 35 and can be of any appropriate length or shape that would allow the passageway 37 to retain its function. The passageway could be located in line with the retainer slot 34, as well as being oriented angularly, as shown in the drawings. Moreover, the access opening 35 can be of any size and shape that will allow the occluding structure at the end of the harness belt to pass through the wall 16 in which the access opening 35 is located. For example, the access opening 35 could be rectangular, as shown in the drawings, circular, oval or any other appropriate shape.

Figure 14:
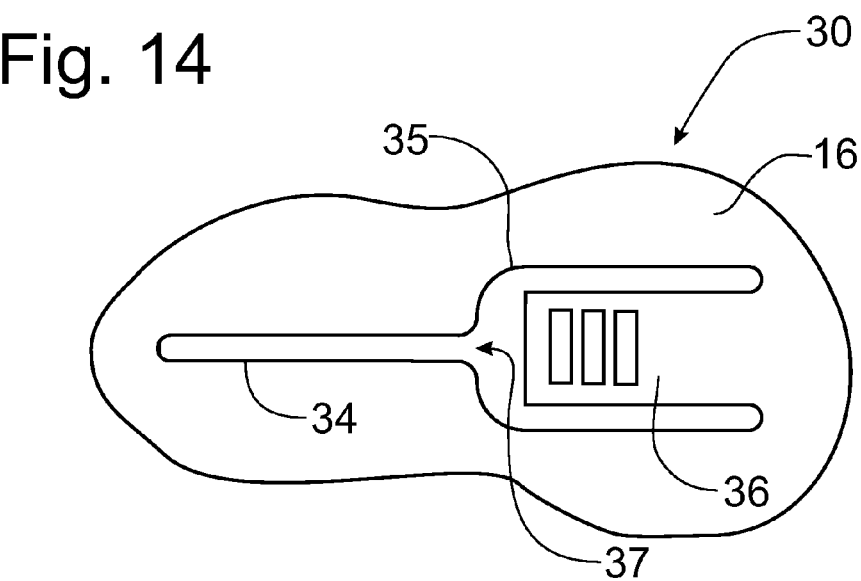
FIG. 14 is a plan view of an alternative embodiment of attachment system incorporating a retention tab in the access opening to restrict movement of the webbing material once placed within the retention slot.

Other alternative embodiments of the attachment system 30 are depicted in FIGS. 14-18. In FIG. 14, the access opening 35 is located immediately at the lateral end of the retainer slot 34 such that the passageway 37 is merely an opening through which the access opening 35 is in connection in communication with the retention slot 34. In FIG. 14, the access opening 35 is provided with a retention tab 36 that is deflectable into the inner wall 16 to allow the passage of the occluding structure 44 past the retention tab 36 and through the access opening 35 so that the webbing material would be able to move through the passageway 37 into the retainer slot 34. In the embodiment of the attachment system 30 in FIG. 14, the distance from the distal end of the retainer slot 34 to the retention tab 36 is substantially equal to the width of the webbing material forming the harness belt. Accordingly, the webbing material would fill the retainer slot 34, pass through the passageway 37 and remain partially within the access opening 35 against the retention tab 36 when in use.

While the passageway 37 in the embodiment of the invention depicted in FIGS. 8 and 9 shows the passageway as an elongated slot that interconnects the retainer slot 34 and the access opening 35, the function of the passageway 37 is to provide communication between the retainer slot 34 and the access opening 35 for the movement of the webbing material therebetween. In the embodiment of the invention depicted in FIG. 14, the passageway is merely an opening providing communication between the retainer slot 34 and the access opening 35 and fulfills the defined function.

Figure 15:
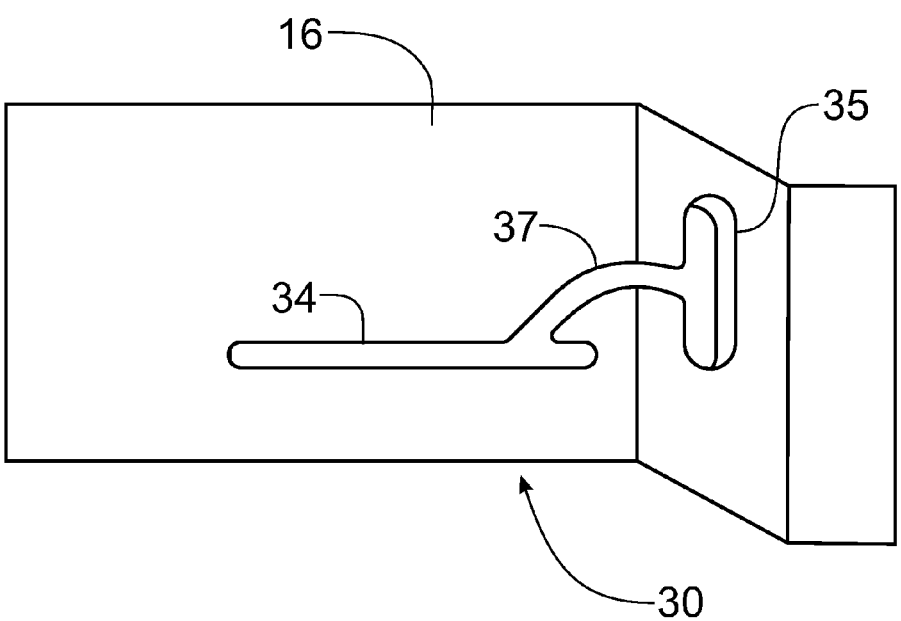
FIG. 15 is a plan view of a second alternative embodiment of the attachment system in which the access opening is on a different plane than the retention slot.

Referring now to FIGS. 15 and 16, one skilled in the art will note that the access opening 35 can be located on a different plane or surface than the retainer slot 34. As with all of the access openings 35 disclosed herein, the access opening 35 has a height that will receive the height of the occluding structure 44. Accordingly, the occluding structure 44 is slid endwise through the access opening 35 such that the adjacent webbing material is aligned with the passageway 37, which as with the embodiment of FIGS. 8 and 9, is an elongated slot, though curved to provide a smooth communication between the retainer slot 34 and the access opening 35. The occluding structure 44 is passed through the access opening 35 to be located behind the inner wall 16 while the webbing material passes through the passageway 37 into the retainer slot 34. With the passageway 37 being opened into the retainer slot 34 at a location slightly spaced from the end of the retainer slot 34, the webbing material can be received wholly within the retainer slot 34. Removal of the harness belt would be accomplished by manipulating the edge of the webbing material to urge the edge into the passage way, whereafter the occluding structure can be passed endwise through the access opening 35. The primary difference between the embodiment depicted in FIG. 15 and the embodiment depicted in FIG. 16 is that the passage way in FIG. 16 is at the end of the retainer slot 34.

Yet additional embodiments of the attachment system 30 are shown in FIGS. 17 and 18 in which the access opening 35 is connected directly to the end of the retainer slot 34. The access opening 35 in FIG. 17 is centralized on the retainer slot 34 with the passageway 37 being an opening to allow communication between the access opening 35 and the retainer slot 34. In FIG. 18, the access opening 35 is offset so that the retainer slot 34 communicates through the passageway 37 into the end of the access opening 35. The depth of the access opening 35 would need to be sufficient to accommodate the movement of the occluding structure endwise at an angle to the opening 35, and also wide enough in the embodiment of FIG. 18 to accommodate the folding of the webbing material against the occluding structure to permit the endwise movement of the occluding structure through the access opening 35 so that the webbing material can pass into the retainer slot 34. Preferably, the retainer slots 34 in the embodiments of FIGS. 17 and 15 would have a width that would receive the webbing material between the distal end of the retainer slot 34 and the wall of the access opening 35 opposite the passageway 37. Thus, the webbing material, after the occluding structure is guided through the access opening 35, would extend across the retainer slot 34, through the passageway 37 and across the access opening 35. Clearly, the occluding structure would have to be folded against the webbing material, at least for the embodiment of FIG. 18, and the removal of the occluding structure would likely be difficult, but the occluding structure would be passed through an access opening 35 so that the webbing material could be received within a narrow retainer slot 34.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a juvenile product having a seating structure including a wall supporting a detachable safety harness formed from webbing material having an end portion formed with an occluding structure that has an occluding dimension oriented generally perpendicularly to the webbing material, the improvement comprising:
an attachment system formed on the wall and including at least one webbing retainer aperture corresponding to said safety harness, said at least one webbing retainer aperture including:
a retainer slot having a first height dimension that will accommodate the passage of a thickness dimension of said webbing material and prevent the passage of said occluding structure, said safety harness being engaged within said retainer slot during operative use of said juvenile product; and
an access opening having a second height dimension that will accept the passage of said occluding structure, said access opening being in communication with said retainer slot to permit said safety harness to be transferred to said retainer slot for normal operation thereof.

2. The juvenile product of claim 1 further comprising:
a passageway providing communication between said access opening and said retainer slot to allow said webbing material to move from said access opening through said passageway into said retainer slot.

3. The juvenile product of claim 2 wherein said access opening is vertically spaced relative to said retainer slot.

4. The juvenile product of claim 3 wherein said passageway is formed as an elongated slot, said passageway and said access opening being oriented at an angle to said retainer slot.

5. The juvenile product of claim 3 wherein said passageway opens into said retainer slot at a distance from one end of said retainer slot at least as great as said first height dimension of said retainer slot.

6. The juvenile product of claim 2 wherein said access opening has a length dimension that is oriented orthogonally to said second height dimension, said length dimension being smaller than a corresponding width dimension of said occluding structure, said retainer slot having a second width dimension that is substantially equal to the corresponding width of said webbing material.

7. The juvenile product of claim 1 wherein access opening is at least partially blocked by a retainer tab that is depressible into said wall to allow the passage of said occluding structure, said retainer tab restricting movement of said webbing material into said access opening unless depressed to open said access opening.

8. The juvenile product of claim 6 wherein said access opening is offset laterally from said retainer slot.

9. The juvenile product of claim 8 wherein said retainer slot has a width dimension extending from one end of said retainer slot to a passageway providing communication between said retainer slot and said access opening, said width dimension being less than a corresponding width of said webbing material such that said webbing material, when positioned within said retainer slot, will extend from said one end of said retainer slot through said passageway to said retainer tab.

10. An attachment system for a juvenile product to engage with a safety harness to secure said safety harness to said juvenile product, the safety harness being formed from a belt including an occluding structure having an occluding dimension that is greater than a thickness dimension of said belt, the attachment system comprising:
a webbing retainer opening including:
a retainer slot having a first height dimension that will accommodate passage of said belt material and prevent the passage of said occluding structure, said safety harness being engaged within said retainer slot during operative use of said juvenile product;
an access opening having a second height dimension that is greater than said first height dimension to permit passage of said occluding structure; and
a passageway interconnecting said access opening and said retainer slot to allow said belt to move from said access opening through said passageway into said retainer slot for normal operation of said safety harness; wherein said access opening is vertically spaced relative to said retainer slot and said access opening has a length dimension that is oriented orthogonally to said second height dimension, said length dimension being smaller than a corresponding width dimension of said occluding structure, said retainer slot having a second width dimension that is substantially equal to the corresponding width of said belt.

11. The attachment system of claim 10 wherein said passageway opens into said retainer slot at a distance from one end of said retainer slot at least as great as said first height dimension of said retainer slot.

12. The attachment system of claim 10 wherein said passageway is formed as an elongated slot, said passageway and said access opening being oriented at an angle to said retainer slot.

13. The attachment system of claim 10 wherein said second height dimension of said access opening will accept passage of said occluding structure without requiring said occluding structure to be manipulated to reduce said occluding dimension.

14. The attachment system of claim 10 wherein access opening is at least partially blocked by a retainer tab that is depressible into said wall to allow the passage of said occluding structure, said retainer tab restricting movement of said webbing material into said access opening unless depressed to open said access opening.

15. The attachment system of claim 14 wherein said access opening is offset laterally from said retainer slot.

16. A juvenile product comprising:
a seating structure including an inner wall supporting a detachable safety harness formed from webbing material having an occluding structure at an end portion thereof to define an occluding dimension oriented generally perpendicularly to a thickness dimension of said webbing material;
an attachment system formed on said inner wall and including a pair of webbing retainer apertures corresponding to said safety harness, each said webbing retainer aperture including:
a retainer slot having a first height dimension that will accommodate the passage of said thickness dimension of said webbing material;
an access opening having a second height dimension that will accept the passage of said occluding structure, said access opening having a length dimension that is oriented orthogonally to said second height dimension, said length dimension being smaller than a corresponding width dimension of said occluding structure, said retainer slot having a second width dimension that is substantially equal to the corresponding width of said webbing material; and
a passageway interconnecting said access opening and said retainer slot to allow said webbing material to move from said access opening through said passageway into said retainer slot.

17. The juvenile product of claim 16 wherein said passageway and said access opening are oriented at an angle to said retainer slot, said passageway opening into said retainer slot at a distance from the ends of said retainer slot at least as great as said first height dimension of said retainer slot.

18. The juvenile product of claim 16 wherein said second height dimension of said access opening will accept passage of said occluding structure without requiring said occluding structure to be manipulated to reduce said occluding dimension.

19. The juvenile product of claim 18 further comprising:
an outer cover member mounted rearwardly of said inner wall such that said occluding structures, when said safety harness is mounted into said retainer slots, are located between said inner wall and said outer cover.

20. The juvenile product of claim 16 wherein access opening is at least partially blocked by a retainer tab that is depressible into said wall to allow the passage of said occluding structure, said retainer tab restricting movement of said webbing material into said access opening unless depressed to open said access opening.

* * * * *